Feb. 18, 1969   J. V. HUGHES, JR., ET AL   3,428,716
METHOD OF INSTALLING HIGH TEMPERATURE FURNACE INSULATION
Filed Nov. 22, 1966
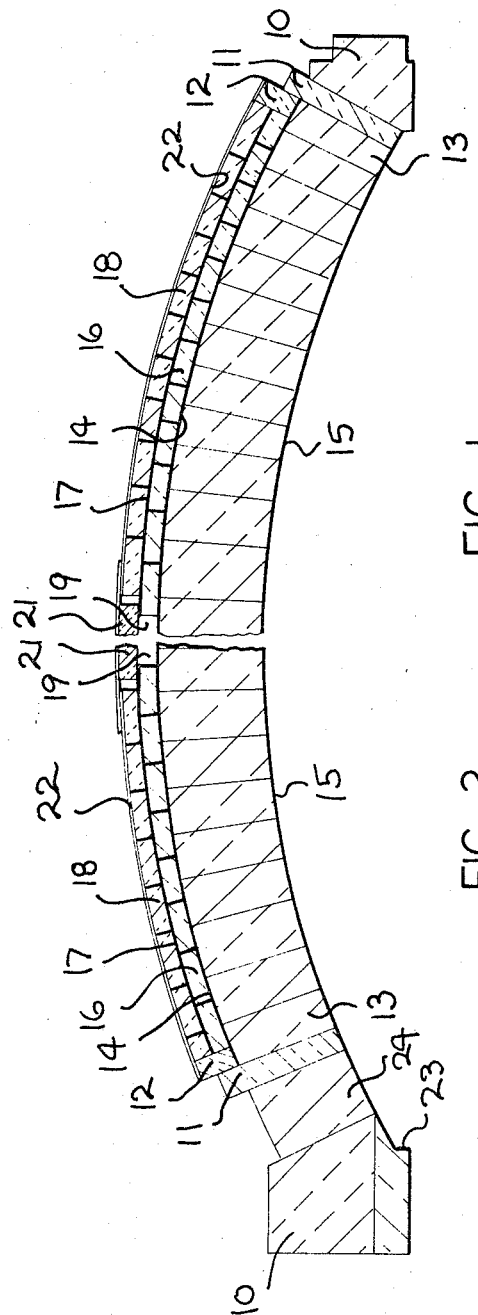
INVENTOR.
CHARLES A. SQUIER
BY JOSEPH V. HUGHES JR.
ATTORNEYS United States Patent Office 3,428,716
Patented Feb. 18, 1969

3,428,716
METHOD OF INSTALLING HIGH TEMPERATURE FURNACE INSULATION
Joseph V. Hughes, Jr. and Charles A. Squier, Toledo, Ohio, assignors to Owens-Illinois, Inc., a corporation of Ohio
Filed Nov. 22, 1966, Ser. No. 596,218
U.S. Cl. 263—52         14 Claims
Int. Cl. F27d *1/00;* F23m *5/00*

ABSTRACT OF THE DISCLOSURE

Method for insulating the refractory brick crown structure of a high temperature furnace which includes laying a course of dry, particulate mortar on the crown structure such that upon heating the mortar sifts to fill the cracks and voids resulting from thermal expansion as the crown is heated.

---

This invention relates to high temperature furnaces, and to improvements in the insulation of the crown structure of high temperature refractory furnaces such as glass melting furnaces. More particularly, the present invention pertains to a novel method of insulating and dry grouting the crown structure of a glass melting furnace which permits complete insulation of the crown before heat up, better sealing of small cracks and voids in the joints of the refractory structure which results in improved thermal performance of the crown at the elevated operating temperatures and thereby contributes to the economy of furnace operation.

High temperature refractory furnaces are extensively used in industrial processes such as the melting of glass and the smelting and refining of metals from their ores. Typical temperatures employed in these operations are in excess of 2500° F., and often approach 3000° F. on a continuous operational basis. As a result of these drastic thermal conditions, serious problems often arise with respect to refractory life, heat loss, and thermal degradation and fatigue of structural members. It is known that these design problems are interrelated, and significantly influenced by the type of insulation employed, as well as the methods and materials used in sealing or grouting the insulation.

It is conventional in glass melting furnace design to construct the crown (roof) from several layers of refractory brick. The refractory most commonly employed is silica brick because of its low cost and thermal endurance.

During the insulation of the furnace crown it has been the practice to grout or seal the various courses of insulation brick on the primary crown structure with an aqueous slurry or paste mortar. This wet grouting is accomplished by either of two methods. The insulation bricks are either individually dipped in the mortar paste, or the mortar is spread onto the individual bricks such as by troweling. In either case, the mortared insulation bricks are then laid in layers or courses as in the construction of an ordinary brick wall.

After the construction has been completed, the excess water in the mortar is allowed to dry and the mortar sets. This drying period results in a loss of operating time. Since most commercial mortars contain binders and fluxes that chemically retain water in addition to any free-water that physically remains, complete dehydration is not achieved during the initial drying period. Consequently, it is necessary to further dry or "bake out" the crown structure at elevated temperatures. This is usually accomplished when the furnace is heated up in preparation for melting a glass batch. Unfortunately, when the furnace is heated up, the chemically bound water is driven off and the free water evaporates. As this water vapor expands, it is driven from the brick structure leaving voids, cracks, chips, channels, vapor pockets, and other defects in the mortar at the brick interfaces. Upon prolonged heating, these mortar defects are permanently hardened or "cake" after the water has been removed.

Accordingly, it is often necessary to reseal and regrout the furnace insulation after furnace heat up, and while the furnace is hot to remedy these mortar defects. This necessitates the exposure of workmen during resealing to the elevated furnace temperatures which presents a safety hazard and because of the high heat conditions, the workmen tend to hurry the work and accordingly, the quality of the work may suffer.

While these problems are prevalent in all high temperature refractory structures, they are particularly acute in the case of the roof or crown structure of the glass melting furnace. The crown is the least stable portion of the glass furnace enclosure as compared to a wall for example, and because of its relatively long transverse span it has a tendency to rise and fall under the expansion and contraction of the roof brick, thus making it by far the most difficult portion of the furnace enclosure to construct and insulate satisfactorily.

Accordingly, it is an object of the present invention to provide a novel method of grouting and insulating high temperature refractory furnace structures that overcomes the disadvantages enumerated above.

It is an additional object to provide a novel furnace crown structure that is constructed and insulated at low temperatures.

It is a further object of this invention to provide a novel method of insulating high temperature refractory structures at room temperature, that does not require the use of an aqueous slurry or paste mortar.

It is a still further object of this invention to provide an improved method of sealing the small cracks and voids that form at the brick interfaces in various courses of refractory brick in the crown structure of a glass melting furnace.

The above and other objects, features and advantages of the present invention will become more apparent from the following description taken in conjunction with the annexed sheet of drawings wherein:

FIG. 1 is a fragmentary, diagrammatic vertical cross section through a typical crown or roof structure of a glass melting furnace illustrating the invention applied thereto.

FIG. 2 is a view similar to FIG. 1 showing a second, widely used crown construction, and illustrating the invention applied thereto.

Referring now in detail to the drawings, a skewback 10, insulation support wedge 11 and rowlock 12, of conventional design are composed of a suitable refractory material such as silica brick. The skewback is joined to a jamb wall (not shown) and both are held in place by suitable braces. The primary crown structure 15 is formed from tapered silica brick 13, mortared with a conventional siliceous mortar paste or slurry, and set into place according to conventional techniques. FIGURE 2 shows another conventional crown structure, including an invert arch 23 and relief arch 24, which is suitable for the purposes of the present invention. The primary crown structure 15 usually ranges from about 9 inches to about 18 inches in thickness.

Before describing the methods of the present invention in detail, it should be emphasized that the crown structure 15 is not per se part of the present invention. As will be understood from the following description, the invention resides in an improved method for insulating this primary crown structure and for grouting the insulation.

Using this crown structure 15 as a starting point, the procedure of the invention is described as follows:

While still at room temperature, a thin course of finely divided, dry, silica mortar 14 is uniformly spread over the primary crown structure 15. This thin layer is generally less than 1 inch in thickness and in most applications a thickness of at least about ¼ inch to about ½ inch is sufficient.

The purpose of this layer is twofold: (a) to sift down into the crack and crevices in the primary crown structure 15 as the structure expands with increasing temperature; and, (b) to form a layer of mortar below and between a course of insulation brick 16. This layer 14 should, therefore be thick enough to insure the presence of mortar under and between the brick 16 at elevated temperatures and after the crown structure 15 has undergone expansion. At the elevated temperatures the mortar will also have a tendency to expand upward to fill the voids between the insulation bricks.

As shown in the drawings, the layer of insulation brick 16 is laid over this layer of dry silica mortar. These bricks are individually worked into the powdered mortar to assure intimate contact with the dry mortar at the brick base. This layer of insulation brick can be any high temperature refractory material, and in many applications silica brick is employed. This insulative layer 16 is usually about 1 inch to about 5 inches in thickness.

Over this insulative layer 16 is placed a second layer of dry finely divided silica mortar 17. This layer is similar in function to the layer 14 and is usually less than 1 inch in thickness, and in ordinary applications a thickness of at least about ¼ inch to ½ inch is satisfactory. As explained above, this layer should be thick enough to leave a substantial layer of mortar between the layers of insulation brick (e.g. brick layers 16 and 18) after the lower layer has experienced thermal expansion.

The second layer of insulative refractory brick 18, of about 1 inch to about 5 inches in thickness, is set in place on the layer of dry silica mortar 17. As is shown in FIGS. 1 and 2, provisions for inspection and thermal expansion are usually made in the form of spacings or gaps 19 at the key line in the two insulative brick layers. An insulation sealing brick 21 can be loosely placed in the secondary insulation 18 as is shown in the drawings. This second layer of insulation brick 18 is worked into the second mortar layer in the manner described for the first layer of insulation brick. Since the layer 18 is the top layer, powdered mortar can be placed between the individual bricks in the layer 18 to asure optimum insulation.

A protective layer 22, such as aluminum foil, is then placed over the entire crown structure to keep out glass batch dust, dirt, moisture and other foreign material. Since there is no water to be driven off, the crown is then ready for use at temperatures of 2500° F. and above without requiring regrouting or resealing of the insulation as the structure expands with increasing temperature. When the crown structure has been exposed to these temperatures of 2500° F. and above for prolonged periods, a certain degree of permanency is achieved in the grouting due to the mild thermal setting action of the mortar. This thermal setting action is due to the presence of a small amount of flux in the mortar. There is not enough flux present to give the structural stability required for a support member such as a wall, but there is enough present to cause the powdered refractory mortar to agglomerate in the form of a crust upon prolonged heating and thereby form an effective thermal barrier. This mild heat setting action permits the easy removal of the insulation brick for inspection and replacement.

The exact reasons for the effectiveness of this dry grouting method is not fully understood. We do know, however, that the dry powdered refractory mortar readily sifts and flows to fill the voids, gaps and crevices created by the expansion and contraction of the refractory crown structure and overlaying layers of insulation brick. This constitutes a significant improvement over the above mentioned slurry and paste mortar techniques which often tend to "cake" as the water is driven off, and consequently do not readily expand with the crown structure as the temperature is raised.

In the above description the phrase, dry, powdered refractory mortar has been used. This refers to a mixture of finely divided or powdered refractory materials with fluxes or binders in various proportions. Typical mortars suitable for the purposes of the present invention include mixtures containing small amounts of alkali oxides and/or alkaline earth oxides, as fluxes, in intimate mixture with finely divided refractories such as silica, alumina or chrome magnesite.

In the foregoing discussion the invention has been discussed with respect to the grouting and insulating of silica roof structures with dry silica mortars. Similarly, the invention is applicable to the insulation and grouting of any multilayer refractory structure wherein layers of insulation brick are placed on a refractory structure. The only requirement is that the grouting material be chemically compatible with the refractory brick at the elevated operating temperatures. The problems associated with chemical compatability in selecting the proper mortar for a particular brick composition are well understood in the art and the same criteria for selection are applicable to the present invention that are applied in the prior art wet mortar technique. Simply stated the compositions of the mortar and the brick are selected to minimize any detrimental chemical interaction that might occur at the elevated operating temperatures. Whenever possible it is desirable that mortar be of the same chemical composition as the refractory brick to minimize this opportunity for detrimental chemical interaction.

Accordingly, silica mortars are used with silica brick, alumina mortars are used with alumina brick, chrome magnesite mortars are used with chrome-magnesite bricks, etc.

For instance, when alumina bricks are used in the crown construction, a finely divided dry alumina mortar of the composition set forth below is suitable for dry grouting at low temperatures according to the methods of this invention.

| Oxide: | Percent by weight (calcined basis) |
|---|---|
| $SiO_2$ | 5–6 |
| $Al_2O_3$ | 90–92 |
| CaO | 0.02–0.04 |
| MgO | 0.02–0.04 |
| $Na_2O$ | 0.1–0.3 |
| $Fe_2O_3$ (impurity) | 0.1–0.3 |
| $TiO_2$ (impurity) | 0.1–0.3 | when alumina-silica bricks are used in the crown construction a range of compositions suitable for the dry grouting is:

| Oxide: | Percent by weight (calcined basis) |
|---|---|
| $SiO_2$ | 40–45 |
| $Al_2O_3$ | 45–52 |
| CaO | 0–1 |
| MgO | 0–1 |
| $Na_2O+K_2O$ | 0.05–3 |
| $TiO_2$ (impurity) | 0–2 |
| $Fe_2O_3$ (impurity) | 0–2 |

When the refractory structure is constructed from chrome-magnesite brick, a finely divided, dry mortar of the composition set forth below is suitable for dry grouting at low temperatures according to the present invention.

| Oxide: | Percent by weight (calcined basis) |
|---|---|
| $SiO_2$ | 5–12 |
| $Al_2O_3$ | 25–30 |
| $Cr_2O_3$ | 5–29 |
| $Fe_2O_3$ | 11–15 |
| CaO | 0.4–0.8 |
| MgO | 16–18 |

Screen analysis:

| Mesh | Percent |
|---|---|
| 20–40 mesh | 1–2 |
| 40–100 mesh | 6–10 |
| 100–200 mesh | 9–13 |
| Through 200 mesh | 76–84 |

Typical properties and compositions of mortars suitable for the purposes of the present invention where the structural and insulation brick is silica brick are set forth below.

COMPOSITION (CALCINED BASIS)

| Oxide: | Percent by weight |
|---|---|
| $SiO_2$ | 88–99 |
| $R_2O(Na_2O+K_2O)$ | <5 |
| $RO(CaO+MgO)$ | <10 |

Impurities including:

| | |
|---|---|
| $Al_2O_3$ | <1 |
| $Fe_2O_3$, $TiO_2$ | Trace |

PROPERTIES

Maximum working temperature ° F__ 3000
Typical screen analysis of the dry mortar:

| | Percent |
|---|---|
| +65 | 4–9 |
| −60 +100 | 5–11 |
| −100 +150 | 6–12 |
| −150 +200 | 7–13 |
| −200 +325 | 9–16 |
| −325 | 40–70 |

In grouting the insulation shown in the silica crown structure represented by the drawings, specific suitable mortar compositions within the range set forth above are:

| Refractory | Percent | |
|---|---|---|
| | Composition A | Composition B |
| $SiO_2$ | 90.4 | 99.0 |
| Flux: | | |
| CaO | 5.2 | Trace |
| MgO | 3.5 | Trace |
| $Na_2O$ | 0.2 | 0.6 |
| Impurities: | | |
| $Al_2O_3$ | 0.4 | 0.6 |
| $Fe_2O_3$ | 0.008 | 0.3 |
| $TiO_2$ | 0.03 | 0.03 |
| Screen Analysis: | | |
| +65 | 6 | |
| −60 +100 | 8 | |
| −100 +150 | 8 | |
| −150 +200 | 8 | |
| −200 +325 | 14 | |
| −325 | 56 | |

The above mortar data is on a calcined basis so no organic material is reported. There are, however, several commercially available mortar compositions formulated for slurry or paste applications that are suitable for practicing the present invention that contain, in addition to the oxides enumerated above, up to about 10% by weight of organic coagulation agents selected to cause the refractory oxides to form a homogeneous slurry with water. We have found that these commercially available mortar compositions can be used effectively in conjunction with the dry grouting method disclosed above, since the organic materials merely burn away as the temperature is increased and have no detrimental effect.

It is apparent from the foregoing that the present invention provides a novel method of dry grouting and insulating the crown structure of a glass melting furnace which permits complete insulation of the crown before heat-up, better sealing of small cracks and voids in the joints of the refractory structure and improved thermal performance of the crown on heating up which contributes substantially to the economics of maintenance and operation.

Obviously, the invention should not be limited to the details of the illustrative construction since these can be considerably varied.

Other and further modifications may be resorted to without departing from the spirit and scope of the appended claims.

Having thus described the invention, what is claimed is:

1. The method of insulating the refractory brick crown structure of a glass melting furnace comprising the steps of
   laying a course of dry, powdered, compatible, refractory mortar directly on said refractory brick crown structure to form a uniform layer thereon,
   laying a course of compatible refractory insulation brick on said uniform layer while at low temperature, and then
   heating said crown structure to glass melting temperatures to effectuate a mild seting action in the mortar, whereby said mortar sifts to fill the cracks and voids resulting from thermal expansion of the crown structure and insulation brick as the crown is heated.

2. The method of claim 1, wherein said refractory crown is constructed from silica brick, said insulation brick is silica brick, and said refractory mortar is comprised of a mixture of finely divided silica and small amounts of fluxes selected from the group consisting of alkali oxides, alkaline earth oxides and mixtures thereof.

3. The method of claim 2, wherein said insulation brick is set into place on the mortar so as to cause the mortar to intimately contact the entire base of said brick.

4. The method of claim 1, further including the steps of laying a second course of dry, powdered, compatible refractory mortar directly on said course of refractory insulation brick to form a uniform layer thereon and laying a second course of compatible, refractory insulation brick on said second course of mortar prior to heating the crown structure.

5. The method of claim 4, wherein said courses of dry powdered, compatible refractory mortar, are of sufficient thickness after exposure to elevated temperatures, so that continuous layers of mortar remain:
   (a) between said crown structure and the first course of refractory insulation brick; and
   (b) between said first course of refractory insulation brick and the second course of refractory insulation brick.

6. The method of claim 4, wherein said mortar is of the following weight percent composition range on a calcined basis:

| | Percent |
|---|---|
| $SiO_2$ | 88–99 |
| $Al_2O_3$ | <1 |
| $R_2O$ $(Na_2O+K_2O)$ | <5 |
| $RO$ $(CaO+MgO)$ | <10 |

7. The method of claim 6, wherein said mortar is of the composition:

| | Percent |
|---|---|
| $SiO_2$ | 90.4 |
| $Al_2O_3$ | 0.2 |
| CaO | 5.2 |
| MgO | 3.5 |
| $Na_2O$ | 0.2 |

8. The method of claim 6, wherein said mortar is of the composition:

| | Percent |
|---|---|
| $SiO_2$ | 99.0 |
| $Al_2O_3$ | 0.6 |
| $Na_3O$ | 0.6 |

9. The method of claim 1, wherein said refractory crown is constructed from alumina brick, said insulation brick, is alumina and said refractory mortar is comprised of a mixture of finely divided alumina and silica, and fluxes selected from the group consisting of alkali, metal oxides, alkaline earth metal oxides and mixtures thereof.

10. The method of claim 9, wherein said mortar is of the following weight percent composition range on a calcined basis:

| | Percent |
|---|---|
| SiO$_2$ | 5–6 |
| Al$_2$O$_3$ | 90–92 |
| CaO | 0.02–0.04 |
| MgO | 0.02–0.04 |
| Na$_2$O | 0.1–0.3 |

11. The method of claim 1, wherein said refractory crown is constructed from chrome magnesite brick, said insulation brick is chrome magnesite brick, and said refractory mortar comprises a mixture of finely divided chrome magnesite refractory and fluxes selected from the group consisting of alkali oxides and alkaline earth oxides.

12. The method of claim 11, wherein said mortar is of the following weight percent composition range on a calcined basis:

| | Percent |
|---|---|
| SiO$_2$ | 5–12 |
| Al$_2$O$_3$ | 25–30 |
| Cr$_2$O$_3$ | 5–29 |
| Fe$_2$O$_3$ | 11–15 |
| CaO | 0.4–0.8 |
| MgO | 16–18 |

13. The method of claim 1, wherein said refractory crown is constructed from alumina silica brick, said insulation brick is alumina silica brick and said refractory mortar comprises a mixture of finely divided alumina-silica refractory and fluxes selected from the group consisting of alkali oxides and alkaline earth oxides.

14. The method of claim 13, wherein said mortar is of the following weight percent composition range on a calcined basis:

| | Percent |
|---|---|
| SiO$_2$ | 40–45 |
| Al$_2$O$_3$ | 45–52 |
| CaO | 0–1 |
| MgO | 0–1 |
| Na$_2$O+K$_2$O | 0.05–1 |

References Cited
UNITED STATES PATENTS

| | | | |
|---|---|---|---|
| 1,394,470 | 10/1921 | Charles | 110—99 |
| 1,516,604 | 11/1924 | Hosbein | 110—99 |
| 1,733,664 | 10/1929 | Harter et al. | 110—99 |
| 2,961,978 | 11/1960 | Sommer, et al. | 110—99 |

JOHN J. CAMBY, *Primary Examiner.*

U.S. Cl. X.R.

263—46

UNITED STATES PATENT OFFICE
CERTIFICATE OF CORRECTION

Patent No. 3,428,716　　　　　　　　　　　　　　　　February 18, 1969

Joseph V. Hughes, Jr., et al.

It is certified that error appears in the above identified patent and that said Letters Patent are hereby corrected as shown below:

Column 6, line 68, "$Na_3O$" should read -- $Na_2O$ --.

Signed and sealed this 31st day of March 1970.

(SEAL)
Attest:

Edward M. Fletcher, Jr.　　　　　　　　　　　　　　WILLIAM E. SCHUYLER, JR.
Attesting Officer　　　　　　　　　　　　　　　　　　　Commissioner of Patents